(12) United States Patent
Werner

(10) Patent No.: US 7,581,762 B1
(45) Date of Patent: Sep. 1, 2009

(54) ELASTIC HOSE CLAMP

(75) Inventor: Frank Werner, Teton Village, WY (US)

(73) Assignee: Origin Inc., Jackson, WY (US)

( * ) Notice: Subject to any disclaimer, the term of this patent is extended or adjusted under 35 U.S.C. 154(b) by 0 days.

(21) Appl. No.: 11/900,324

(22) Filed: Sep. 11, 2007

Related U.S. Application Data

(60) Provisional application No. 60/849,660, filed on Oct. 5, 2006, provisional application No. 60/847,519, filed on Sep. 27, 2006.

(51) Int. Cl.
*F16L 33/00* (2006.01)

(52) U.S. Cl. .................................................. 285/254

(58) Field of Classification Search .............. 285/254, 285/915, 15, 370; 138/99
See application file for complete search history.

(56) References Cited

U.S. PATENT DOCUMENTS

| | | | | |
|---|---|---|---|---|
| 599,203 | A | * | 2/1898 | Stenger et al. ............... 152/371 |
| 601,683 | A | * | 4/1898 | Wane et al. .................. 285/254 |
| 683,482 | A | * | 10/1901 | Neumeyer ................... 285/254 |
| 986,081 | A | * | 3/1911 | Patterson .................... 285/254 |
| 1,607,353 | A | * | 11/1926 | Key et al. .................... 285/179 |
| 2,742,305 | A | * | 4/1956 | Converse, III et al. ...... 277/605 |
| 2,924,546 | A | * | 2/1960 | Shaw ........................... 156/94 |
| 3,638,968 | A | * | 2/1972 | Barks .............................. 285/8 |
| 3,907,342 | A | * | 9/1975 | Dudek .......................... 285/242 |
| 4,103,399 | A | | 8/1978 | Oetiker ........................... 24/22 |
| 4,638,531 | A | | 1/1987 | Ribrant ........................ 24/274 |
| 4,699,404 | A | * | 10/1987 | Drevs .......................... 285/244 |
| 4,756,337 | A | * | 7/1988 | Settineri ....................... 138/99 |
| 5,630,255 | A | | 5/1997 | Eliasson ....................... 24/274 |
| 5,814,387 | A | * | 9/1998 | Orihara et al. ................ 428/63 |
| 5,894,864 | A | * | 4/1999 | Rich ............................ 138/99 |

OTHER PUBLICATIONS

Griswold et al., R.; "Preparation of Ultradrawn Polyethylene by a Novel Radial-Compression Method," *Polymer Engineering and Science*, Mid-May 1978, vol. 18, No. 6, pp. 537-545.

Farris & Filippov, R. & A.; "Experimental Method of Determining the Uniaxial-compression Characteristics of Thin-walled Structures," *Experimental Mechanics*, vol. 22, Issue 2, Feb. 1982, pp. 49-51.

* cited by examiner

*Primary Examiner*—David E Bochna
(74) *Attorney, Agent, or Firm*—Westman, Champlin & Kelly, P.A.

(57) ABSTRACT

A hose clamp for joining flexible hose or tubing to an internal fitting, or to repair a break, or to join two lengths of such tubing, has a plurality of wraps of a stretched strand of material around the exterior with the end secured to the hose. The clamp is formed by stretching the strand so each wrap is under tension and wrapping the strand over the hose numerous times, and securing the ends of the strand to prevent unwinding. Various types of applications are described.

10 Claims, 3 Drawing Sheets

ELASTIC HOSE CLAMP

This application claims priority under 35 U.S.C. §119(e) based on U.S. provisional application 60/849,660 filed Oct. 5, 2006, and on U.S. provisional application 60/847,519, filed Sep. 27, 2006, both of which are incorporated by reference.

FIELD OF THE INVENTION

This disclosure relates to the field of hose clamps used for fittings and joints in flexible tubing.

BACKGROUND OF THE DISCLOSURE

There are several kinds of hose clamps on the market. Some are adjustable in size except for very small tubing. Examples are U.S. Pat. Nos. 5,630,255 (Eliason); 4,638,531 (Ribrant); and 4,103,399 (Oetiker).

Rubber bands may sometimes used to secure, for example, a bag over the end of a tube. This is only practical when the tube is short or the bag is very small, since the rubber band must be looped, usually repeatedly, over one part or the other.

SUMMARY OF THE DISCLOSURE

The disclosed clamp uses a stretched strand wrapped around a hose to clamp the hose to an internal fitting. The strand compresses the hose onto a fitting. A protective overwrap can be provided.

The clamp provides an easy and simple way to join flexible hose to a tube or fitting. The disclosed hose clamp is easy to use and is applicable to any hose diameter without the need to select a particular clamp size. It requires few or no tools. It is more compact and therefore more convenient in many uses, as compared with typical hose clamps. In addition, some types of hose are subject to shrinkage and become loose with time. The present hose clamp eliminates this. Repair of garden hose is a common need for this clamp but there are many other potential uses. It adapts well to very small tubing.

DESCRIPTION OF THE ILLUSTRATIVE EMBODIMENTS

Figure 1:
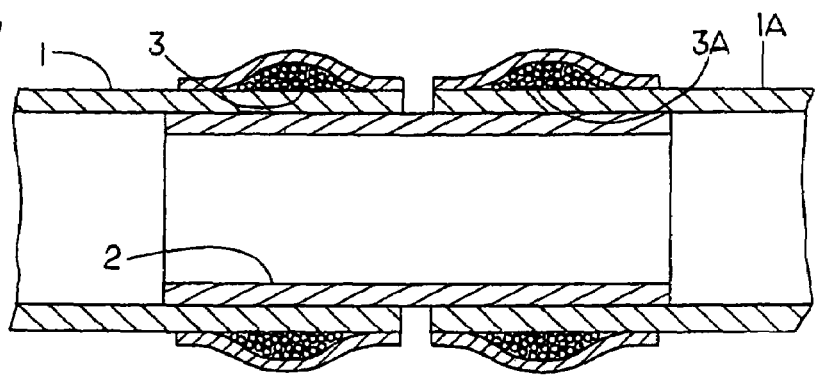
FIG. 1 illustrates a typical form of the hose clamp of the present disclosure on a garden hose repair in a cross sectional view of a circular tubing structure.

FIG. 1 is a cross sectional view that shows details of a typical embodiment of the disclosure as used for a garden hose repair. In this figure, 1 and 1A are separated sections of the garden hose. The internal fitting is shown at 2, and slips into ends of the two sections of hose, such as for a repair of damaged hose. The disclosed repair uses strands, 3 and 3A, composed of elastomeric material usually called herein "elastomers". Each strand is tightly wrapped over the tube several times and may be several layers thick. The wrapping is shown in more detail in the cross sectional view of FIG. 2. A preferred material is elastic, segmented polyurethane fiber strands. Such strands are commercially available under the trademarks Spandex and Lycra® (Invista North America S.A.R.L.). Other elastomeric strands can be used, such as rubber and various synthetic elastic materials.

Figure 2:
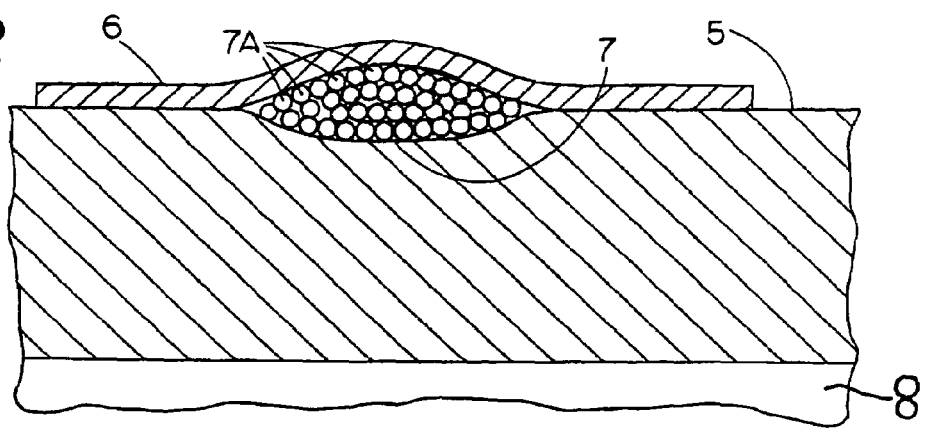
FIG. 2 is a magnified view to show detail of the clamp structure.

FIG. 2 shows numerous elastomeric strand wraps 7A of a single continuous strand 7 wound around a garden hose 5.

FIG. 2 illustrates typical deformation of the outer surface of the hose or tubing is shown at 7, where the elastomeric wraps have somewhat compressed or deformed the hose or tubing 5. The strand wraps 7A serve a clamp hose 5 to an internal fitting 8. Internal fitting 8 is commonly called a coupling when two hoses are joined. It may be a plug, spigot, or other type of tube fitting. It is seen that the strand wraps 7A near the hose are compressed and shortened as the outer wraps are applied. For this reason, it is important that for most purposes the elastomeric material must allow elongation of 15% to 25% and often, as much as 300% or 500%. For example, steel wire wraps would be in tension only in the outer layer(s) and inner layers would tend to be in compression. In practical cases where rubber or the preferred Lycra is used, elongation should be 300% to 400% or even more (length increased by factor of 3 or 4 more). The amount of elongation is not critical in most applications. In a few kinds of application, stronger strands such as Nylon® Dupont Company) may be used when little hose or tubing deformation is expected and strong strands may be preferred.

In cases where abrasive or other detrimental action could reach strand wraps 7A, a layer of material 6 may be placed over the winding of strands. Ordinary black electrical tape is suitable for this purpose in many applications such as garden hose.

Figure 3:
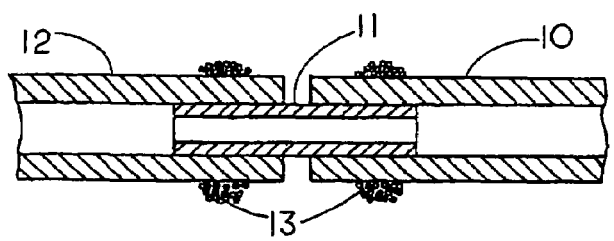
FIG. 3 illustrates a joint between 2 tubes, suited to a general tube size (large or small) such as for laboratory uses.

FIG. 3 shows a more general application to smaller or larger flexible hose or tubing than a garden hose. The flexible tubing sections 12 and 10 fit over an internal connector tube or fitting 11. While the internal connector tube 11 is normally more rigid than the outer flexible tube ends 12 and 10, the hose clamp also functions well when the internal connector tube is rather soft. The wraps 13 of a continuous elastomeric strand used for clamping the tube sections 10 and 12 function in the same way as shown in FIGS. 1 and 2. This example of FIG. 3 shows a coupling of two tube sections. The two tube sections 12 and 10 need not be of the same size and material, in which case the opposite end portion of internal connector tube 11 may have two different, suitable diameters. Instead of coupling two flexible tubes as illustrated, the clamping method may be used to join a tube to another structure, to a plug, or to another smaller inner connector tube.

While FIG. 3 illustrates typical laboratory tubing connections, for simplicity, it does not show deformation of the tubing. In many applications, the tubing may be reasonably soft such as for gum rubber tubing or soft vinyl tubing. Often in such cases substantial deformation of the tubing may be necessary. The elastic strands 13 readily cause such deformation with a sufficient number of wraps on soft tubing. This means that the outer tubing may have a considerably larger inside diameter than the outside diameter of the inner tube or coupling 11 and that strands that tolerate high percent elongation are needed. The elastic wrap can still provide a good clamping action.

Figure 4:
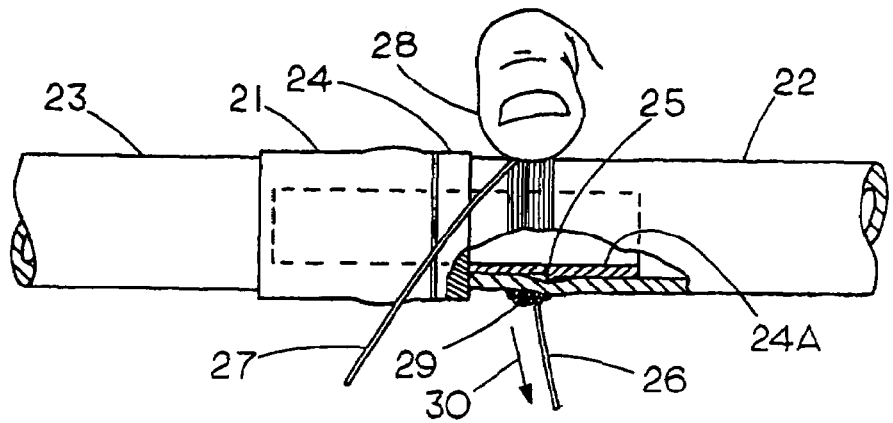
FIG. 4 is a schematic illustration of starting a wrapping sequence suitable for such a hose application as shown in FIG. 1.

FIG. 4 is a schematic illustration of starting the wrapping process to complete the second wrapped clamp between a garden hose 23 and another length of garden hose 22, such as for repair of a break. For this example, it is assumed that the elastomeric strand is denier 2240 Lycra and that one person is doing the job. As will become apparent, the second wrapped clamp is somewhat simpler if two people are involved.

The process begins by choosing an adequate length of the elastic strand. In the case of garden hose and Lycra, when 40 wraps are desired, an appropriate starting length of unstretched Lycra is about 30 inches. A user may test the amount by stretching a short length of about 5 times its original length; for example, by firmly grasping a 2 inch length of the strand and stretching it to about 10 inches. This is the stretch amount (and tension) suitable for most applications with Lycra.

The coupling 24 and 24A preferably has a single annular barb indicated at 25 on its outer surface, as opposed to some couplings having multiple barbs. Multiple barbs function well, but do not generally achieve as good strength and leak resistance as a single barb, since the single barb is able to bite more deeply into the hose.

It is assumed that the first joint 21 has been wrapped and covered as illustrated. The second wrap is somewhat more complicated in that there is an extended hose in each direction from the repair. The coupling 24 and 24A fits closely to the internal diameter of the two pieces of hose 22 and 23.

As noted above, strands of material, which allow far less elongation such as metal wire do not serve well. The reason is that progressive wrapping with elastomeric strands diminishes the diameter of the tube and of the first wrap to a degree so that inner metal wraps would become loose. Elastomeric strands readily tighten down onto lower layers of wrap. Stated otherwise, most beginning wraps of metal wire would provide no clamping and actually could impede clamping of outer wraps, while elastomeric strands that are stretched far more as they are wrapped tighten down for a secure clamping action.

Many kinds of elastic strands may be used other than the preferred elastomeric, segmented polyurethane fiber. Simple laboratory tests to failure gave the results in Table 1 for various materials. In Table 1, the steel wire with only 0.5% elongation does not perform well because of its small elongation for the reasons stated above. Cotton strands could serve well only for cases of rather firm tubing because the elongation to failure is small, only about 3%. Polyester strands would be satisfactory for some applications where the diameter reduction under the finished wraps is no greater than 10% to 15%. In the case of nylon, a number of variations of nylon are available with different elastic behaviors, but several variations would be useful for the present purposes. The elastomeric polyurethane-based strands as defined above are useful for nearly all cases and are the preferred material because of their ability to tolerate great elongation and chemical stability. Other kinds of elastic materials could be used instead. It is concluded that elongation to failure should be at least 10 to 15% and preferably much greater. For the preferred fiber and others, elongation during wrapping should be at least 25% and preferably 50% or more of the failure elongation for best results.

TABLE 1

| Approximate Percentage Elongation at Tensile Failure | |
|---|---|
| steel wire at 150,000 lb/sq in | 0.5 |
| cotton string | 3.0 |
| polyester sewing thread | 16.0 |
| nylon sewing thread | 50.0 |
| nylon monofilament fishing line | 40.0 |
| Lycra scrubber strands | 500 to 900 |

More wraps of stretched strands are needed as the internal pressure in the tube or hose is increased; as the inside diameter and wall thickness are increased; and for harder grades of the tubing to be clamped. Often there are additional factors. It is found that for garden hose, 30 to 40 tightly stretched wraps of 2240 denier of the preferred strands are suitable. For small, soft kinds of laboratory tubing, only a few wraps may suffice. In such cases, the user must use judgement and experience to determine the required number of wraps of the strand used. For larger and stiffer tubing many more than 40 wraps may be needed. The 2240 denier strand is suitable for many uses. It measures roughly 0.02 to 0.04 inch diameter. Still larger strand size would often be desirable if available.

A common home use is to splice two sections of home garden hose to repair a damaged section. In that case, the finished joint is much smaller than the splices that use any of the conventional hose clamps that are on the market, and thus more convenient for wrapping the hose on a reel or handling otherwise. For garden hose, wrapping tape, such as black vinyl electrical tape over the wrapped strand is rather important to protect the wraps of the elastomeric strand from abrasion. In laboratory use, the outside diameter of such a joint is only slightly larger than the outer tubing's diameter, or even smaller for soft tubing when the wraps embed into the tube.

An important factor is that there is no need to have on hand, various sizes of tubing clamps. The hose clamp disclosed is more compact than most or all other hose clamps.

Figure 5:
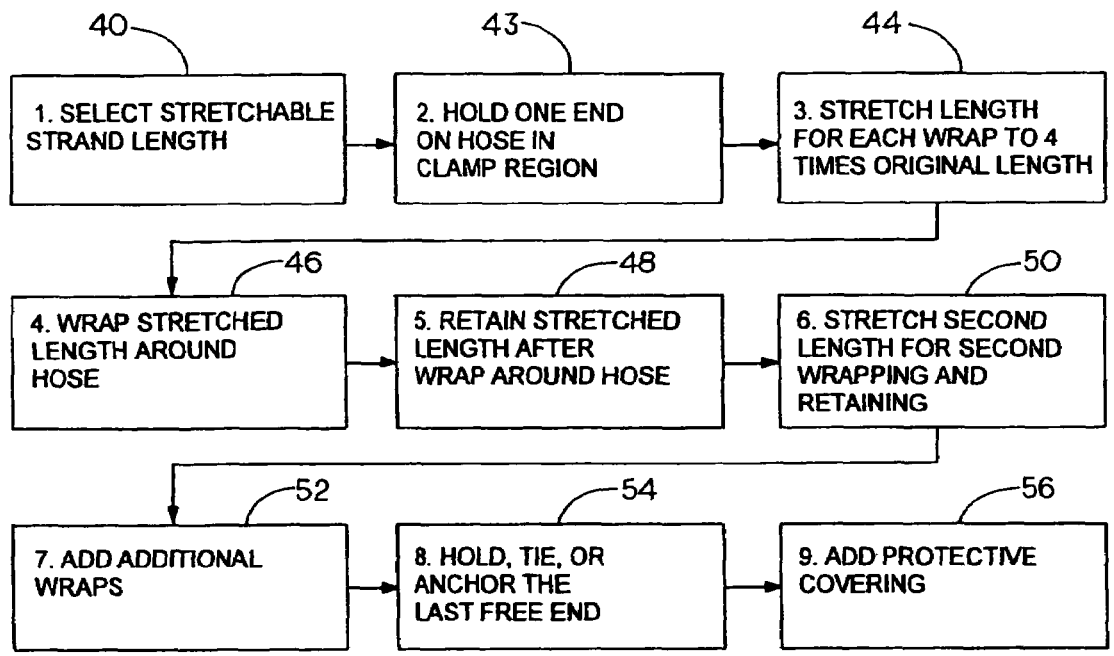
FIG. 5 is a flow diagram of a typical wrapping process for forming a hose clamp.

The procedure is summarized in a block diagram in FIG. 5. Selecting the stretchable strand in shown at block 40 as step 1. Wrapping the strands is started by holding one end of a strand as indicated at block 43 as step 2, and stretching at least one wrap length, step 3 shown at block 44. Wrapping the first turn tightly stretched around the tube or hose is step 4 as shown at block 46. The first wrap of stretched length as step 5 is retained, shown at block 48, for example, by placing the second stretched wrap so that it overlaps a part of the starting end. This holds the starting end of the strand in place. The second wrap length is stretched and wrapped as step 6, shown at block 50, and the step 7 is adding additional wraps as needed, shown at block 52. Step 8 is to hold and anchor the last free end, as indicated at block 54, and step 9 is adding the protective covering to complete the process at block 56.

When both the tube and fitting are moderately long, so the stretched strand cannot be passed across an end of the tube, a one-person process is as follows. After completing the first wrap, while keeping the strand stretched with a first hand the stretched strand is wrapped around the tube and clamped with thumb pressure using the second or other hand, at a position prior to where the stretched strand meets the under wraps. While maintaining the thumb pressure with the second hand, so the just completed wrap remains stretched, the free end of the strand is released by the first hand and the first hand reaches under the tube and grasps the strand, stretches it and completes the next wrap to a position adjacent to the still clamping thumb of the second hand. While maintaining the stretch of the strand (and thus the new wrap) with the first hand, the thumb of the second hand is repositioned to clamp the new wrap so the strand can be released by the first hand. The wrapping and clamping process continues until the desired number of wraps is finished. With two people, this is obviously simpler, since one person can stretch and wrap the stretched strand and the other clamp the wraps.

The end of the final wrap can be tucked under an earlier wrap to suppress unwrapping. An alternate is to tie the end of the final wrap to a short, un-stretched free length of the first wrap, where a suitable length of un-stretched strand is left free of the wrapping at the time when wrapping is started.

Tape is applied over the assembly if desired. Other forms of protective covering may be used instead of tape, as indicated at step 9, block 56.

Figure 6:
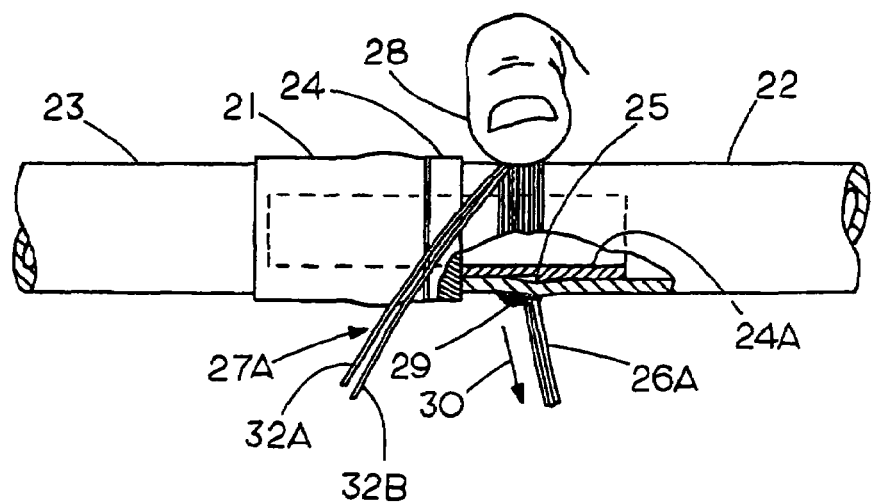
FIG. 6 is a view of a modified form of hose clamp.

Wrapping using a strand made up of a plurality of individual strand segments is shown in FIG. 6. The description and numbers is the same as in connection with FIG. 4, but here the strand 27A is made up of at least two strand segments 32A and 32B and the end 26A also shows these strand segments. The strand 27A is wrapped with the strand segments or lengths in tandem, that is, side by side. They also could be twisted together, or a large number can be enclosed in a cover like a bungee cord, forming a rope. A plurality of strand segments can be used for larger tubes.

For marketing, a kit comprising a small roll of elastomeric strand, a small roll of black electrical tape, and several garden hose splice tubing pieces can be supplied along with brief instructions.

This elastic hose clamp finds utility for home use and also for laboratory or other miscellaneous uses. For large tubing a larger quantity of strands or a small stretchable rope made of individual strands could be supplied.

As an example of the behavior of the novel clamping for laboratory tubing, it was found that a narrow band of 40 tightly wound wraps of 2240 denier of the preferred strands on soft vinyl laboratory tubing 0.25 inch OD by 0.187 inch ID reduced the ID to 0.075 inch. In another example, a narrow band of 20 tightly wound wraps on soft "gum" rubber tubing 0.71 inch OD by 0.46 inch ID reduced the ID to 0.26 inch. These diameter reductions would be much less for more stiff materials, but still entirely practical for stiffer materials, particularly when such large shrinkage of ID is not necessary. These diameter reductions illustrate the degree of clamping that may be achieved when a tube fitting is used that approximates the tube's inside diameter. While usually the fitting stiffness is greater than the tube stiffness, these examples show that a good coupling can be made even when the fitting is as soft or softer than the tube.

A different example for the use of this invention is a case that involves an outer tube that may be thin and flexible such as a fabric tube, the opening of a large bag, or a thin-walled plastic tube. It is sometimes needed to fold and wrinkle such a tube down to the outside of a connecting tube or fitting and use of a clamp such as disclosed herein to secure the connection. The wrapped-strand process of the present disclosure often serves better in such cases as compared with more conventional clamping means. This example could be applied for joining a dust collector bag to a machine, such as in a household vacuum cleaner or a dust collector for various industrial processes. When such fittings are large, a large rope-like strand may be used with only one or a few wraps. Such rope is simply a collection of elastic strands such as Lycra. It would be similar to bungee cord. The rope may be provided with end hooks or fasteners when many repeat closures are needed. The term strand used in the claims also is meant to include a rope or made up of a number of individual smaller strand segments acting together. The term strand also includes 2, 3 or more individual strand segments side by side and stretched and wrapped in union or parallel. Fewer individual wraps of multiple elements or segment strands are needed to compress the hose adequately. A strong rubber band can be used as a strand and the two segments or lengths of the band is stretched and wrapped in tandem, as a strand.

The term "fitting" is used in the claims to mean any item to which a flexible tubing my be joined, such as a length of smaller tube, a coupling that is designed to couple two lengths of the flexible tubing together, and various fittings for same size flexible tubing, such as expanding or reducing end adapters that couple to other items such as valves or spigots, as well as nozzles or plugs and other members to which a flexible tube may be joined.

Also in the claims, the term "strand" refers to elastic, segmented polyurethane fiber strands such as commercially available Lycra® or other elastomeric material such as the various forms of rubber, nylon, polyester strands, similar elastomers and synthetic rubber.

Although the present invention has been described with reference to preferred embodiments, workers skilled in the art will recognize that changes may be made in form and detail without departing from the spirit and scope of the invention.

What is claimed is:

1. A method of joining flexible deformable tubing having an interior bore to an internal fitting inside an open end of the interior bore of the flexible deformable tubing, comprising providing a strand of elastomeric material, stretching the strand of elastomeric material by elongating a strand portion forming a wrap to a length of at least half the length required for tensile failure of the strand, and wrapping the strand portion while stretched over the flexible deformable tubing to form wraps to deform and clamp said flexible deformable tubing to an outer surface of the internal fitting.

2. The method of claim 1, including the step of securing the wrapped strand to prevent unassisted unwrapping.

3. The method of claim 2, wherein the securing step includes wrapping an adhesive abrasion resistant tape layer over the wraps of the strand.

4. The method of claim 1, wherein the flexible tubing comprises home garden hose.

5. The method of claim 1, wherein there is one free length of strand wrapped over the flexible tubing, and including the step of retaining a first end of the strand on the flexible tubing prior to wrapping the strand, continuing wrapping the strand around the flexible tubing until the free length is full wrapped, and securing a second end of the strand to prevent unassisted unwrapping.

6. A method of joining flexible deformable tubing having an interior bore to an internal fitting inside an open end of the interior bore of the flexible deformable tubing, comprising providing a strand of elastomeric material, stretching the strand of elastomeric material by elongating strand portions forming wraps around the flexible deformable tubing, and wrapping the strand portions while stretched to provide a plurality of wraps over the flexible deformable tubing to deform and clamp said flexible deformable tubing to an outer surface of the internal fitting wherein the strand is substantially 2240 denier of at least 0.03 inches in diameter, and the stretching step including elongating a portion of the strand forming each wrap to a length of at least two times an original at rest length of the strand portion when stretching the strand.

7. The method of claim 6, wherein the flexible deformable tubing comprises flexible deformable pressure carrying tubing and the wrapping step comprises wrapping the strand at least 25 times around the flexible deformable pressure carrying tubing.

8. A method of joining flexible deformable tubing to an internal fitting positioned inside an internal opening of the flexible deformable tubing adjacent an end thereof comprising selecting a strand of flexible elastic material that will wrap around the flexible deformable tubing a plurality of times, said strand being selected to be elongatable when stretched to at least 50 percent of its at rest length, retaining a free end of the strand on an outer surface of the flexible deformable tubing overlying the internal fitting, stretching at least a length of the strand sufficient to wrap around the flexible deformable tubing to at least 50 percent of its at rest length and forming a wrap around the flexible deformable tubing to deform the tubing against an outer surface of the internal fitting, and subsequently stretching portions of the strand and forming additional wraps around the flexible deformable tubing, and securing a second end of the strand with respect to the flexible deformable tubing after the additional wraps have been completed.

9. The method of claim 8 and further comprising placing an adhesive tape over the wraps and the second end of the strand to secure the second end relative to the flexible tubing.

10. The method of claim 8, wherein the selecting step comprises selecting a strand of elastomeric material.

* * * * *